US012774844B2

(12) United States Patent
Gomes et al.

(10) Patent No.: US 12,774,844 B2
(45) **Date of Patent: *Oct. 27, 2026**

(54) VACUUM GENERATING SYSTEM FOR AN APPLIANCE INCORPORATING A VACUUM INSULATED STRUCTURE

(71) Applicant: WHIRLPOOL CORPORATION, Benton Harbor, MI (US)

(72) Inventors: Alberto R. Gomes, St. Joseph, MI (US); Lynne F. Hunter, Dorr, MI (US); Abhay Naik, Stevensville, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 118 days.

This patent is subject to a terminal disclaimer.

(21) Appl. No.: 18/767,127

(22) Filed: Jul. 9, 2024

(65) Prior Publication Data

US 2024/0361067 A1 Oct. 31, 2024

Related U.S. Application Data

(60) Continuation of application No. 18/127,047, filed on Mar. 28, 2023, now Pat. No. 12,055,341, which is a continuation of application No. 17/530,719, filed on Nov. 19, 2021, now Pat. No. 11,650,003, which is a continuation of application No. 17/063,155, filed on Oct. 5, 2020, now Pat. No. 11,231,223, which is a division of application No. 16/304,393, filed as (Continued)

(51) Int. Cl.
*F25D 23/06* (2006.01)

(52) U.S. Cl.
CPC .......... *F25D 23/06* (2013.01); *F25D 2201/14* (2013.01); *Y02B 40/00* (2013.01)

(58) Field of Classification Search
CPC .... F25D 23/06; F25D 23/085; F25D 2201/14; Y02B 40/00
USPC .................................. 312/406, 406.1, 406.2
See application file for complete search history.

(56) References Cited

U.S. PATENT DOCUMENTS

| | | | |
|---|---|---|---|
| 2,164,143 | A | 6/1939 | Munters |
| 2,747,269 | A | 5/1956 | Atchison |
| 5,252,408 | A | 10/1993 | Bridges et al. |

(Continued)

FOREIGN PATENT DOCUMENTS

| | | | |
|---|---|---|---|
| EP | 0645576 | B1 | 3/1995 |
| WO | 2004010042 | A1 | 1/2004 |

(Continued)

*Primary Examiner* — James O Hansen
(74) *Attorney, Agent, or Firm* — Price Heneveld LLP

(57) ABSTRACT

An appliance includes an outer wrapper and an inner liner placed within the outer wrapper and spaced apart from the outer wrapper to define an insulating space. A trim breaker extends between the inner liner and the outer wrapper to define a structural cabinet. The trim breaker defines a front face of the cabinet. The trim breaker defines a gas conduit disposed within a wall of the structural cabinet proximate the insulating space. The gas conduit is adapted to define selective communication between the insulating space and an exterior of the structural cabinet. An insulating material is disposed within the insulating space, wherein the gas conduit is substantially free of the insulating material.

19 Claims, 8 Drawing Sheets

Related U.S. Application Data application No. PCT/US2016/053711 on Sep. 26, 2016, now Pat. No. 10,830,526.

(56) References Cited

U.S. PATENT DOCUMENTS

| | | | |
|---|---|---|---|
| 5,500,305 | A | 3/1996 | Bridges et al. |
| 5,509,248 | A | 4/1996 | Dellby et al. |
| 5,695,844 | A | 12/1997 | Neeser et al. |
| 5,827,385 | A | 10/1998 | Meyer et al. |
| 6,038,830 | A | 3/2000 | Hirath et al. |
| 6,109,712 | A | 8/2000 | Haworth et al. |
| 6,375,292 | B2 | 4/2002 | Nishimoto |
| 6,485,122 | B2 | 11/2002 | Wolf et al. |
| 6,858,280 | B2 | 2/2005 | Allen et al. |
| 9,038,403 | B2 | 5/2015 | Cur et al. |
| 9,062,480 | B2 * | 6/2015 | Litch ..................... E05C 19/161 |
| 9,221,210 | B2 | 12/2015 | Wu et al. |
| 9,400,133 | B2 | 7/2016 | Miyaji et al. |
| 10,830,526 | B2 | 11/2020 | Gomes et al. |
| 10,852,054 | B2 | 12/2020 | Kim et al. |
| 11,052,579 | B2 | 7/2021 | Deka et al. |
| 11,231,223 | B2 | 1/2022 | Gomes et al. |
| 2002/0041134 | A1 | 4/2002 | Wolf et al. |
| 2011/0260351 | A1 | 10/2011 | Corradi et al. |
| 2013/0255304 | A1 | 10/2013 | Cur et al. |
| 2013/0257257 | A1 | 10/2013 | Cur et al. |
| 2013/0270732 | A1 | 10/2013 | Wu et al. |
| 2014/0346942 | A1 | 11/2014 | Kim et al. |
| 2015/0147514 | A1 | 5/2015 | Shinohara et al. |
| 2015/0267958 | A1 | 9/2015 | Kuehl et al. |
| 2016/0258671 | A1 | 9/2016 | Allard et al. |
| 2017/0157809 | A1 | 6/2017 | Deka et al. |
| 2017/0159998 | A1 | 6/2017 | Dherde et al. |
| 2019/0120544 | A1 | 4/2019 | Deka |
| 2021/0118002 | A1 | 4/2021 | Kim |
| 2022/0074645 | A1 | 3/2022 | Gomes et al. |

FOREIGN PATENT DOCUMENTS

| | | | |
|---|---|---|---|
| WO | 2013140816 | A1 | 9/2013 |
| WO | 2016056745 | A1 | 4/2016 |

* cited by examiner

Method 400 for Forming a Vacuum Insulated Structure within a Structural Cabinet

VACUUM GENERATING SYSTEM FOR AN APPLIANCE INCORPORATING A VACUUM INSULATED STRUCTURE

CROSS-REFERENCE TO RELATED APPLICATION

The present application is a continuation of U.S. patent application Ser. No. 18/127,047 filed Mar. 28, 2023, now U.S. Pat. No. 12,055,341, which is a continuation of U.S. patent application Ser. No. 17/530,719 filed Nov. 19, 2021, now U.S. Pat. No. 11,650,003, which is a continuation of U.S. patent application Ser. No. 17/063,155 filed Oct. 5, 2020, now U.S. Pat. No. 11,231,223, which is a divisional of U.S. patent application Ser. No. 16/304,393 filed Nov. 26, 2018, now U.S. Pat. No. 10,830,526, which is a national stage of International Application No. PCT/US2016/053711 filed Sep. 26, 2016, all of which are entitled VACUUM GENERATING SYSTEM FOR AN APPLIANCE INCORPORATING A VACUUM INSULATED STRUCTURE, the entire disclosures of which are hereby incorporated herein by reference.

FIELD OF THE DEVICE

The device is in the field of vacuum insulated structures for appliances, and more specifically, an air movement system disposed within the appliance for generating a vacuum within a vacuum insulated structure.

SUMMARY

In at least one aspect, an appliance includes an outer wrapper and an inner liner placed within the outer wrapper and spaced apart from the outer wrapper to define an insulating space. A trim breaker extends between the inner liner and the outer wrapper to define a structural cabinet. The trim breaker defines a front face of the cabinet. The trim breaker defines a gas conduit disposed within a wall of the structural cabinet proximate the insulating space. The gas conduit is adapted to define selective communication between the insulating space and an exterior of the structural cabinet. An insulating material is disposed within the insulating space, wherein the gas conduit is substantially free of the insulating material.

In at least another aspect, an appliance includes a structural cabinet having an interior cavity defined by an inner liner, an outer wrapper and a trim breaker that extends between the inner liner and the outer wrapper. A gas conduit is defined within an interior cavity of the structural cabinet, wherein the interior cavity also includes an insulation space that is partially separated from the gas conduit by a filter member. A plurality of gas valves are selectively operable between open and closed positions, the open position defined by fluid communication between an exterior of the structural cabinet and the insulating space via the gas conduit, the closed position defined by the interior cavity being hermetically sealed at the plurality of valves.

In at least another aspect, a method of forming a vacuum insulated structure includes steps of coupling a trim breaker to an inner liner and an outer wrapper to define a structural cabinet and an insulating space therein, the trim breaker defining an interior gas conduit that is at least partially separated from the insulating space. An insulating material is disposed within the insulating space. A plurality of gas valves are attached to the structural cabinet. The plurality of gas valves are in selective communication with the insulating space via the interior gas conduit. A vacuum chamber is placed around at least a portion of the structural cabinet such that the plurality of gas valves are disposed within the vacuum chamber. Gas is expressed from the vacuum chamber to define a first gas pressure proximate the exterior of the structural cabinet and around the plurality of gas valves. The first gas pressure is less than a second gas pressure defined within the insulating space and the gas conduit, thereby defining an open position of the plurality of gas valves. Gas is expressed from the insulating space through the plurality of gas valves in the open position via the gas conduit and into the vacuum chamber, wherein the expressed gas is further expressed from the vacuum chamber, wherein as the gas is expressed through the gas conduit, the insulating material is maintained in the insulating space. The plurality of gas valves are placed in the closed position by defining a substantially equalized pressure within the vacuum chamber and the insulating space, wherein the first gas pressure is approximately equal to the second gas pressure. Gas is returned to the vacuum chamber such that the first gas pressure is greater than the second gas pressure, and wherein the plurality of gas valves are maintained in the closed position. The vacuum chamber and the structural cabinet are separated.

These and other features, advantages, and objects of the present device will be further understood and appreciated by those skilled in the art upon studying the following specification, claims, and appended drawings.

DETAILED DESCRIPTION OF EMBODIMENTS

Figure 1:
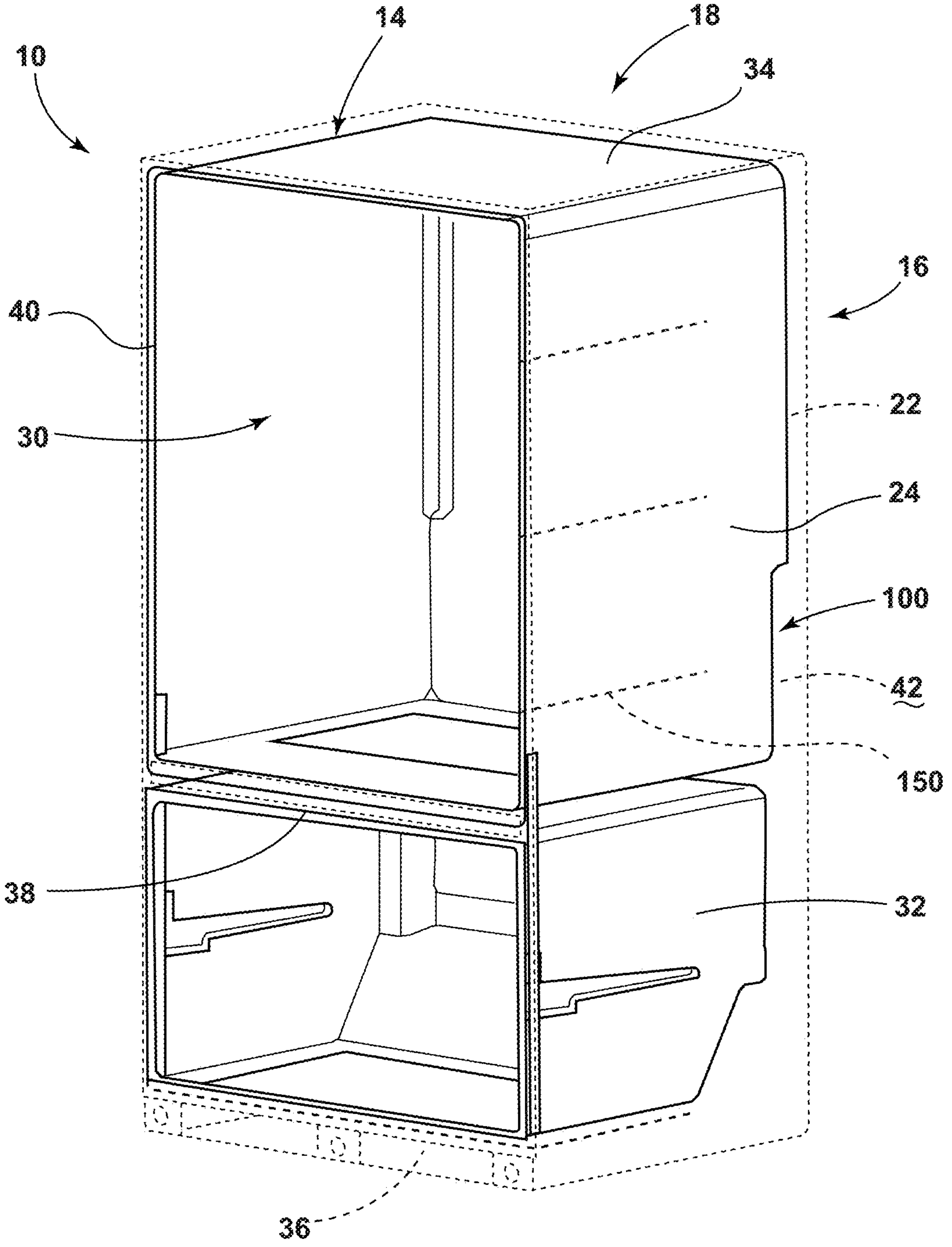
FIG. 1 is a schematic perspective view of a structural cabinet for an appliance incorporating an aspect of the vacuum generating system.
Figure 2:
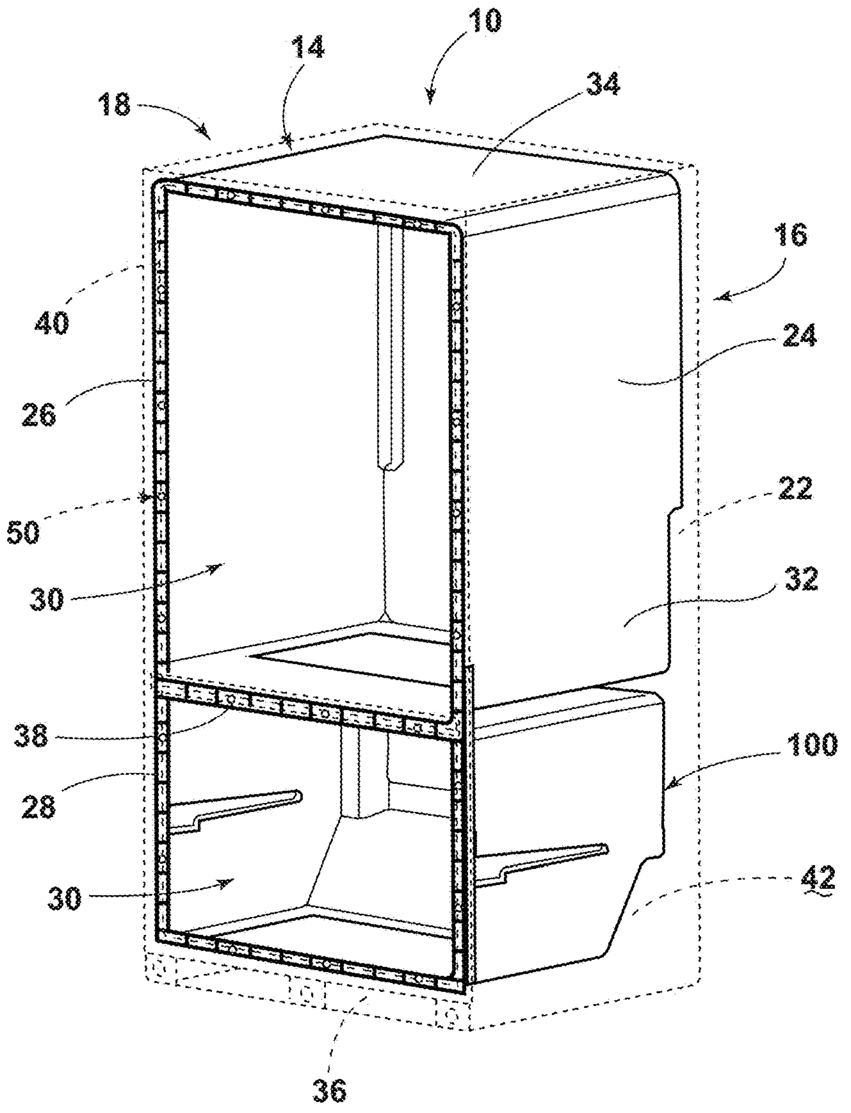
FIG. 2 is a schematic perspective view of a structural cabinet for an appliance incorporating another aspect of the vacuum generating system.
Figure 3:
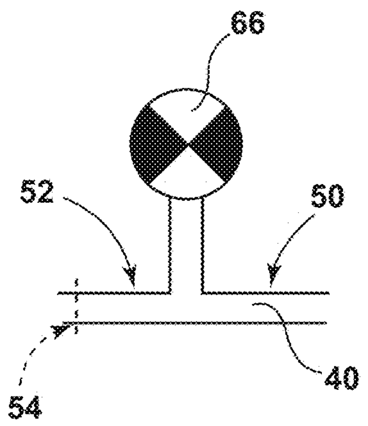
FIG. 3 is a schematic illustration exemplifying a gas valve used within an aspect of the vacuum generating system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, reference numeral 10 generally refers to a vacuum generating system for drawing gas 12, such as air, from an insulating space 14 defined within a structural cabinet 16 for an appliance 18, and maintaining an at least partial vacuum 20 within the insulating space 14. According to the various embodiments, an appliance 18 can include an outer wrapper 22 and an inner liner 24 that is placed within the outer wrapper 22. The inner liner 24 and outer wrapper 22 are spaced apart from one another to define the insulating space 14 therebetween. A trim breaker 26 extends between the inner liner 24 and the outer wrapper 22 to define the structural cabinet 16 with the insulating space 14 defined therein. The trim breaker 26 defines a front face 28 of the structural cabinet 16, where the front face 28 of the structural cabinet 16 defines various apertures for refrigerated compartments 30 within the structural cabinet 16. The trim breaker 26 can extend along the front face 28 of the sidewalls 32, top wall 34 and bottom wall 36 of the structural cabinet 16. Additionally, the front face 28 can extend along a mullion 38 that extends across an interior refrigerated compartment 30 of the structural cabinet 16 to define multiple refrigerated compartments 30. It is contemplated that the trim breaker 26 can define a gas conduit 40 disposed proximate the front face 28 of the structural cabinet 16 proximate the insulating space 14. The gas conduit 40 can be adapted to define a selective communication between the insulating space 14 and an exterior 42 of the structural cabinet 16. An insulating material 44 is disposed within the insulating space 14, where the gas conduit 40 is substantially free of the insulating material 44.

Referring again to FIGS. 1-8, to further define the vacuum generating system 10, at least one gas valve 50 is disposed within a portion of the trim breaker 26. The at least one gas valve 50 is operable between open and closed positions 52, 54. The gas valve 50 can be a passively operated valve or can be a valve that is manually crimped and closed. The open position 52 is defined by a fluid communication existing between the insulating space 14 and the exterior 42 of the structural cabinet 16 via the gas conduit 40. In this manner, the gas valve 50 is adapted to extend at least partially into the gas conduit 40 to allow for movement of air from the insulating space 14 through the gas conduit 40 and out of the gas valve 50, when the gas valve 50 is in the open position 52. The closed position 54 of the gas valve 50 is defined by the gas conduit 40 and the insulating space 14 being hermetically sealed relative to the exterior 42 of the structural cabinet 16. In this manner, the closed position 54 of the various gas valves 50 substantially prevents, or totally prevents, the flow of gas 12 from the insulating space 14 and the gas conduit 40 to the exterior 42 of the structural cabinet 16. In this manner, the various gas valves 50 in the closed position 54 serve to maintain an at least partial vacuum 20 within the insulating space 14 and the gas conduit 40.

Referring again to FIGS. 3-11, the open position 52 of the various gas valves 50 is defined by, or can be achieved by, the vacuum generating system 10 defining a first gas pressure 60 present proximate the exterior 42 of the structural cabinet 16. Simultaneously, a second gas pressure 62 is present within the insulating space 14 and the gas conduit 40. This second gas pressure 62 within the insulating space 14 and the gas conduit 40 is less than the first gas pressure 60 around the exterior 42 of the structural cabinet 16. In this manner, the higher second gas pressure 62 within the insulating space 14 and the gas conduit 40 causes an outward force interior that pushes a portion of the gas valve 50 outward to allow for the expression of gas 12 from the insulating space 14, through the gas conduit 40, and out of the gas valve 50 that is now in the open position 52. Accordingly, drawing air from a vacuum chamber 64 through the use of a vacuum pump 66 also serves to draw air from the insulating space 14 via the gas conduit 40 and through the various gas valves 50 in the open position 52.

Referring again to FIGS. 5-11, the expression of gas from the vacuum chamber 64 and from within the insulating space 14 of the structural cabinet 16 eventually results in a substantially equalized pressure 70 between the first and second gas pressures 60, 62 present within the vacuum chamber 64 and the insulating space 14, respectively. Once the first and second gas pressures 60, 62 are substantially equalized, or are equalized, the outward force is removed and the gas valves 50 define the closed position 54. It is contemplated that the resting state of the plurality of gas valves 50 can be in the closed position 54 such that the gas valves 50 are adapted to move to the closed position 54 when the first and second gas pressures 60, 62 are equalized.

Referring again to FIGS. 3-11, once the gas valves 50 are moved to the closed position 54, the vacuum generating system 10 can be deactivated and air can be returned to the vacuum chamber 64 and around the exterior 42 of the structural cabinet 16. In this manner, the vacuum chamber 64 has the first air pressure that is consistent with the typical atmospheric pressure surrounding the vacuum chamber 64. Because the plurality of gas valves 50 have been moved to the closed position 54, after substantially all of the air was removed from the vacuum chamber 64, the various gas valves 50 remain in the closed position 54 when air is reintroduced into the vacuum chamber 64. The reintroduced air generates an inward force 80 that pushes a portion of the gas valve 50 against the exterior 42 of the structural cabinet 16. In this manner, the air that is returned into the vacuum chamber 64 is not permitted to enter into the insulating space 14 since the various gas valves 50 are now in the closed position 54 in the insulating space 14 and gas conduit 40 are each hermetically sealed from areas exterior 42 to the structural cabinet 16. Accordingly, the closed position 54 that reaches the various gas valves 50 is defined by the second gas pressure 62 present within the insulating space 14 and the gas conduit 40 being equal to or less than the first gas pressure 60 that is present around the exterior 42 of the structural cabinet 16.

Referring again to FIGS. 4-8, the at least one gas valve 50 can be in the form of an umbrella valve 90, where a portion of the umbrella valve 90 extends through at least a portion of the exterior 42 of the structural cabinet 16. In such an embodiment, the gas valve 50 includes an operable flap 92 that is operable to define the open and closed positions 52, 54 of the gas valve 50. The operable flap 92 is adapted to engage the exterior 42 of the structural cabinet 16 when in the closed position 54. The operable flap 92 is further adapted to deflect away from the structural cabinet 16 when in the open position 52 to allow for the release of air from the insulating space 14 via the gas conduit 40 and through the gas valves 50 in the open position 52. It is contemplated that the operable flap 92 can extend over one or more venting apertures 94 defined within the exterior 42 of the structural cabinet 16. When the gas valves 50 are in the closed position 54, the operable flap 92 covers these venting apertures 94 to hermetically seal the venting apertures 94 from allowing the release of gas 12 from within the insulating space 14 and the gas conduit 40. When the gas valve 50 is moved to the open position 52, the operable flap 92 deflects away from the surface of the structural cabinet 16 and defines a fluid communication between the insulation space and the exterior 42 of the structural cabinet 16 via the gas conduit 40 and the various gas valves 50.

Figure 4:
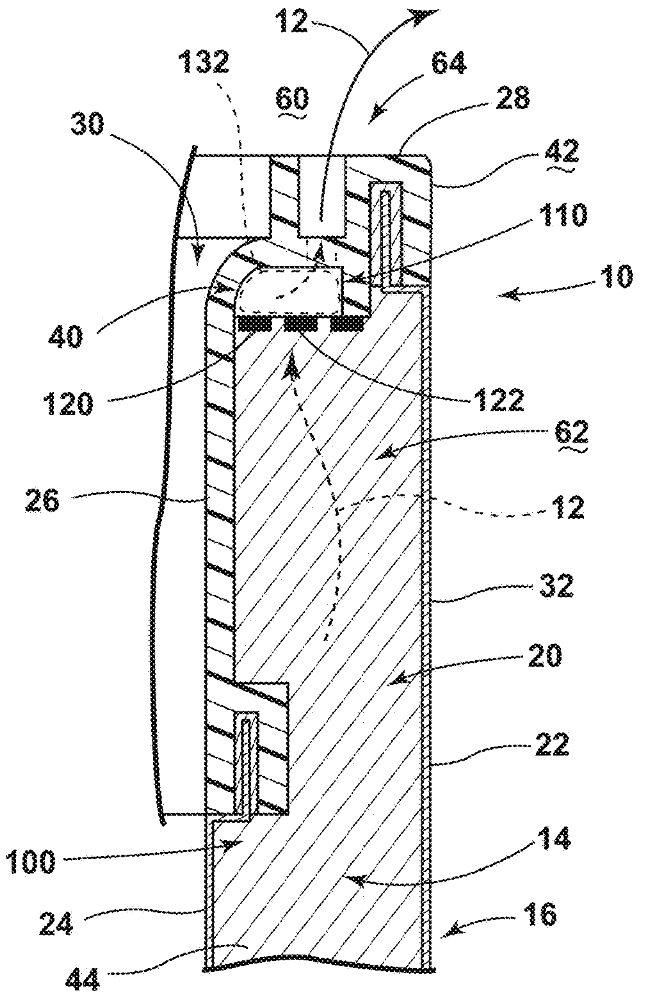
FIG. 4 is a cross-sectional view of a trim breaker incorporated within an aspect of the structural cabinet and incorporating portions of the vacuum generating system.
Figure 5:
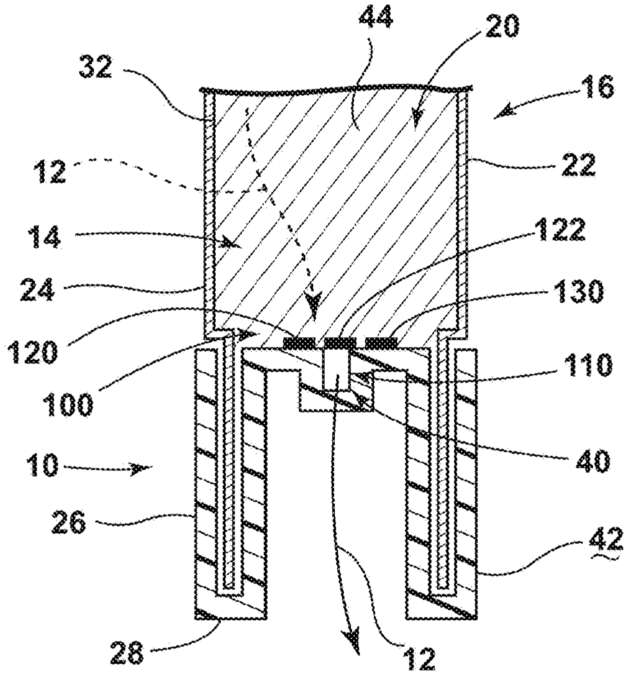
FIG. 5 is a schematic cross-sectional view of a wall of the structural cabinet incorporating an aspect of the vacuum generation system.
Figure 6:
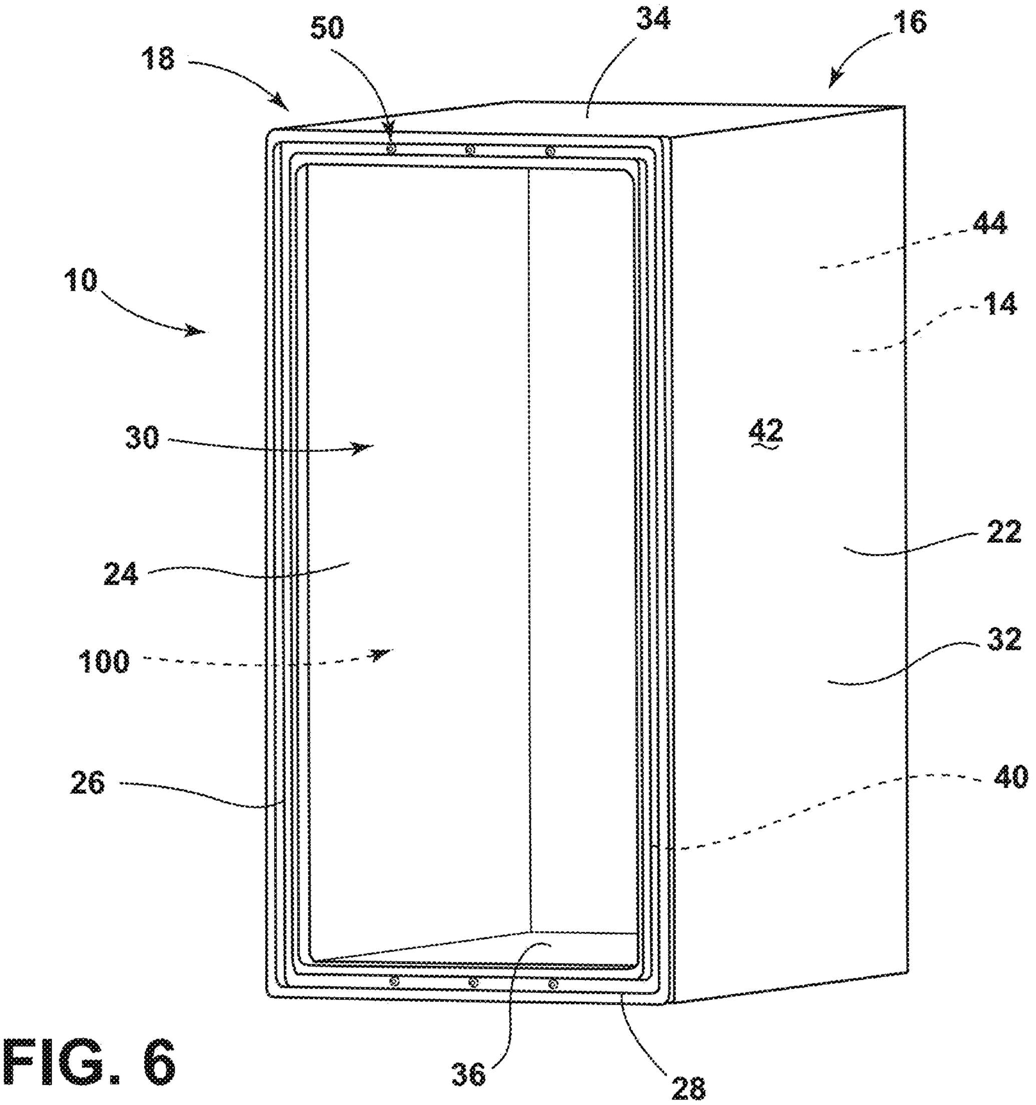
FIG. 6 is a perspective view of a structural cabinet incorporating an aspect of the vacuum generating system incorporating a plurality of gas valves within a trim breaker.
Figure 7:
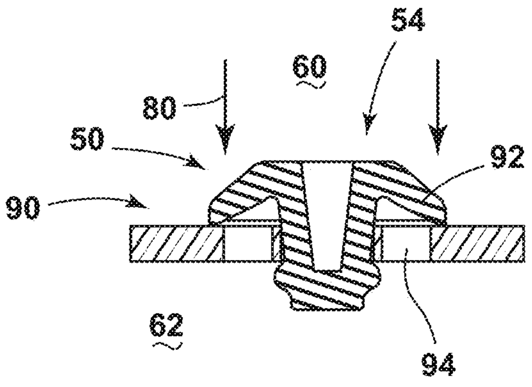
FIG. 7 is a schematic cross-sectional view of the gas valve of FIG. 6 illustrating the gas valve in a closed position.
Figure 8:
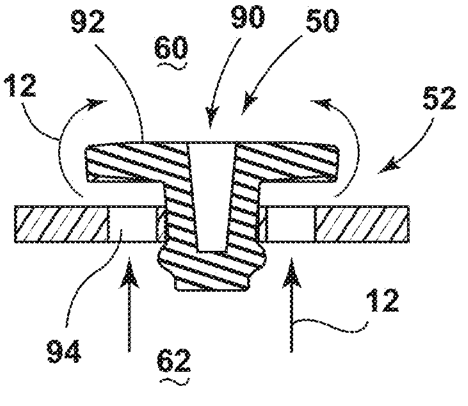
FIG. 8 is a cross-sectional view of the gas valve of FIG. 7 illustrating the gas valve in an open position.
Figure 11:
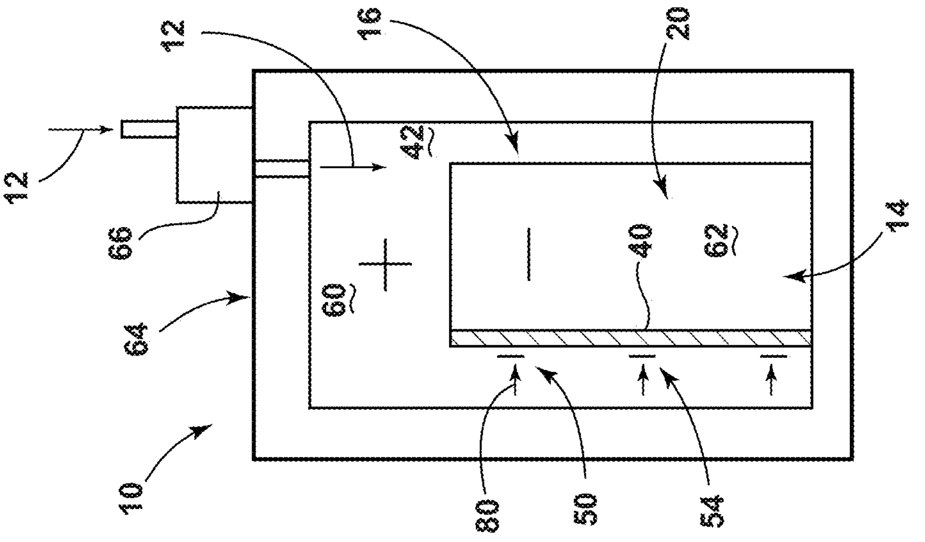
FIG. 11 is a schematic cross-sectional view of the vacuum chamber of FIG. 10 illustrating the vacuum generation system returning air to the vacuum chamber while maintaining an at least partial vacuum within the insulating space of the structural cabinet and maintaining the gas valves in a closed position.
Figure 10:
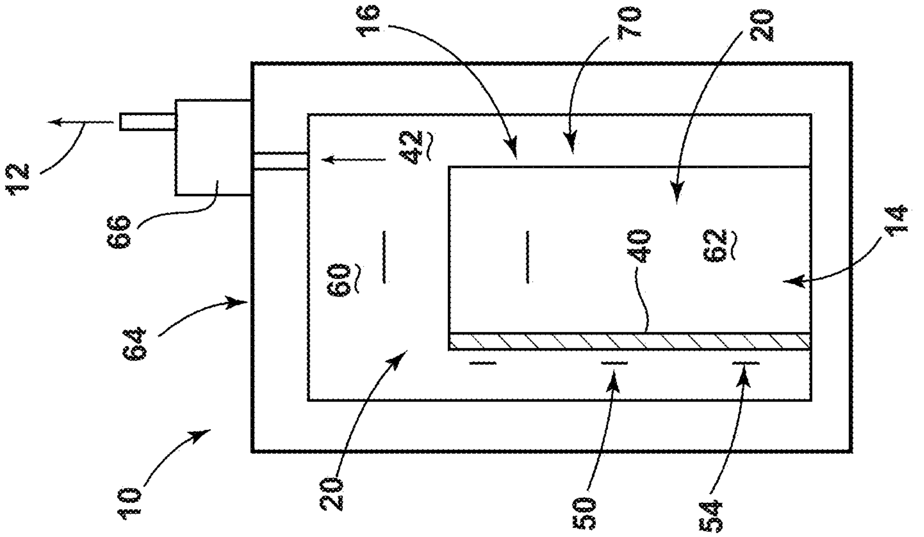
FIG. 10 is a schematic cross-sectional view of the vacuum chamber of FIG. 9 showing the gas generating device creating an equalized low air pressure within the vacuum chamber and within an insulating space of the structural cabinet to place the gas valves in a closed position.
Figure 9:
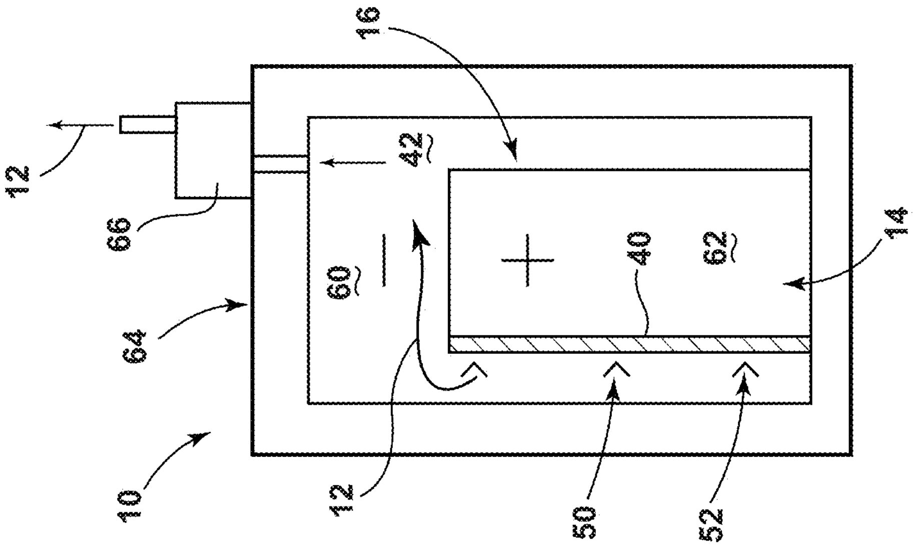
FIG. 9 is a schematic cross-sectional view of an aspect of the gas generating system with a structural cabinet entirely disposed within a vacuum chamber, and the vacuum generating system operating to place the gas valves in an open position.
Figure 12:
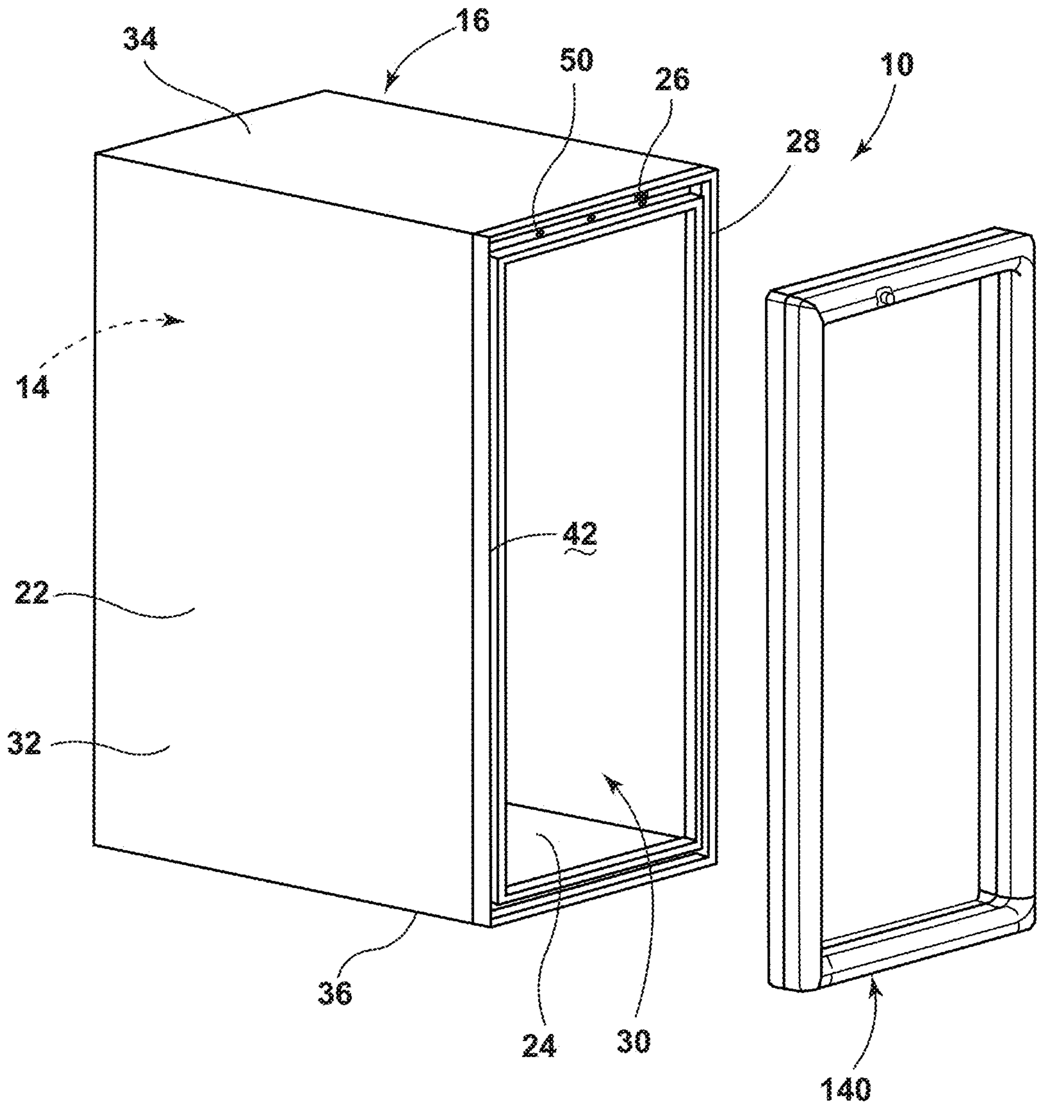
FIG. 12 is a partially exploded perspective view of an aspect of a vacuum frame used to generate an at least partial vacuum around a trim breaker of a structural cabinet.
Figure 13:
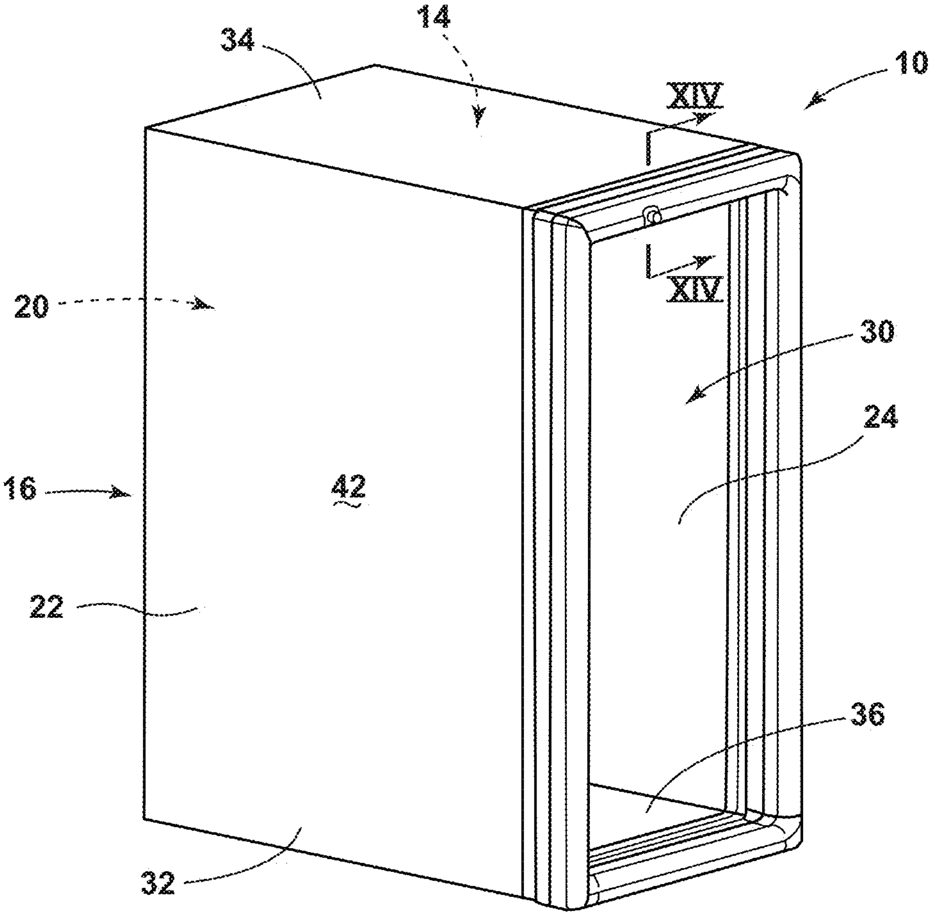
FIG. 13 is a perspective view of a vacuum frame attached to the front edge of the structural cabinet of FIG. 12.
Figure 14:
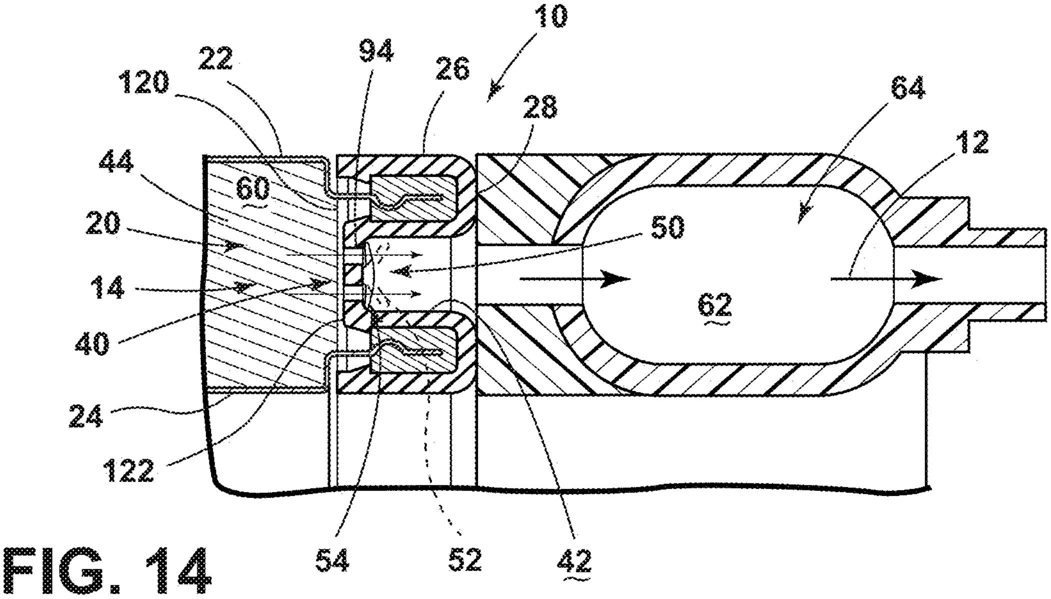
FIG. 14 is a cross-sectional view of the structural cabinet of FIG. 13 taken along line XIV-XIV.
Figure 15:
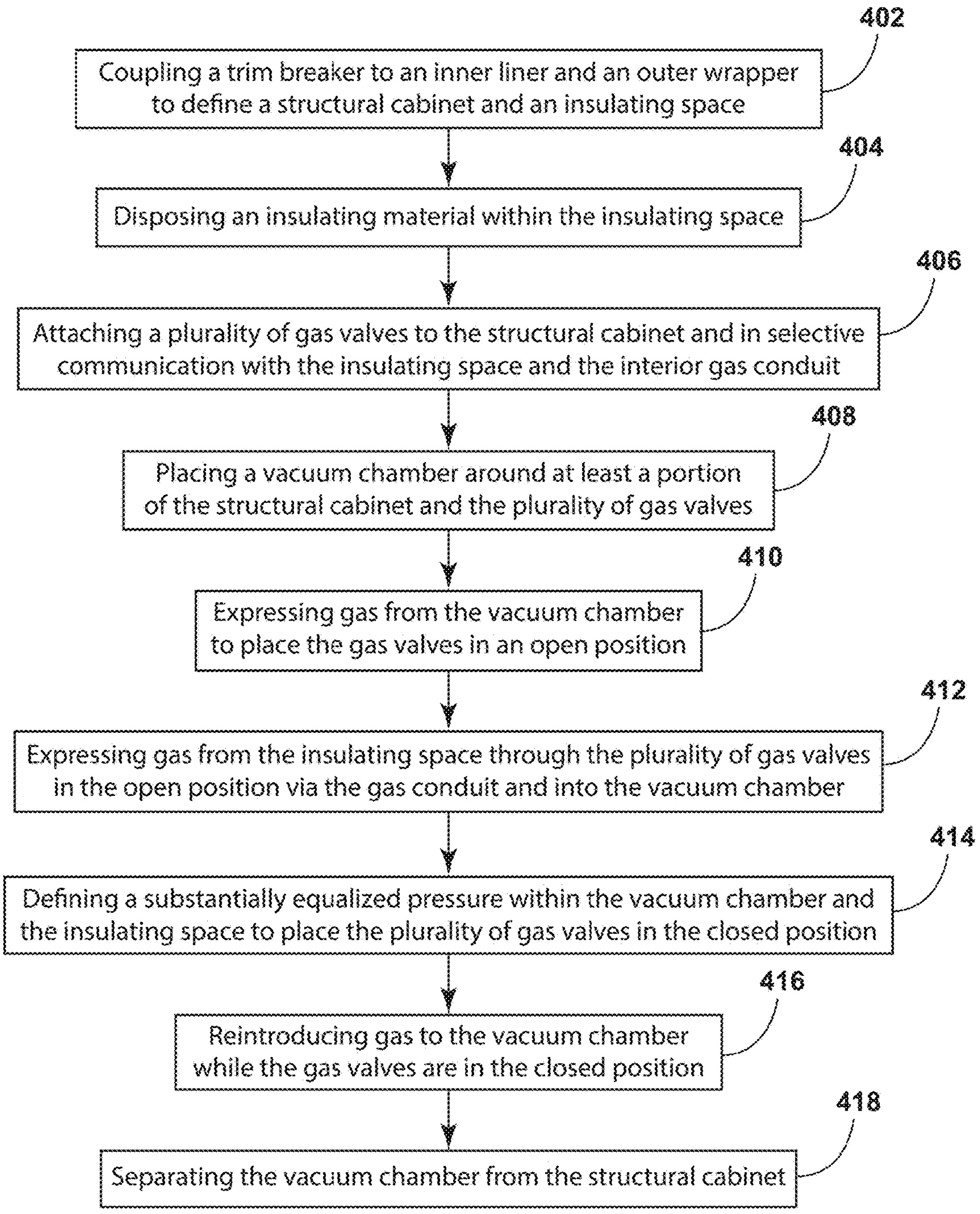
FIG. 15 is a schematic flow diagram illustrating a method for forming a vacuum insulated structure.

According to the various embodiments, the gas conduit 40, which is defined within the interior cavity 100 of the structural cabinet 16 can be disposed proximate the trim breaker 26, the inner liner 24 or the outer wrapper 22. Accordingly, the gas conduit 40 can define a substantially continuous conduit that extends through various portions of the interior cavity 100 proximate the insulating space 14 of the structural cabinet 16. In this manner, when the vacuum generating system 10 draws air from the vacuum chamber 64, air is moved from the insulating space 14 and into the gas conduit 40. Again, the gas conduit 40 extends substantially continuously or continuously through the interior cavity 100 of the structural appliance 18 to allow for the substantially free and efficient movement of gas 12 from the insulating space 14 and through the gas valves 50 via the gas conduit 40. The gas conduit 40 can be defined by various integral structures that are formed within the trim breaker 26, the inner liner 24, the outer wrapper 22, or combinations thereof such that the gas conduit 40 may be adapted to run through various portions of the interior cavity 100 of the structural cabinet 16. By way of example, and not limitation, FIGS. 4 and 5 illustrate a gas conduit 40 that is integrally formed within a portion of the trim breaker 26 such as a filter recess 110. In such an embodiment, the gas conduit 40 runs within the interior cavity 100 of the structural cabinet 16 proximate the front face 28 of the structural cabinet 16. Again, it is contemplated that the gas conduit 40 can be in the form of a single continuous air moving channel that connects or substantially connects each of the gas valves 50 with one another such that each of the gas valves 50 are also placed in communication with one another via the gas conduit 40.

Referring again to FIGS. 2-8, it is contemplated that the gas conduit 40 can be at least partially defined by a filter member 120 that defines a boundary 122 between the insulating space 14 and the gas conduit 40. In this manner, the filter member 120 can be disposed along an outer surface of the gas conduit 40 to maintain the gas conduit 40 to be free of the insulating material 44. In other words, in order to allow for the substantially free movement of air through the gas conduit 40, the filter member 120 prevents the insulating material 44 from infiltrating the gas conduit 40 that might serve to clog or impede the flow of air through the gas conduit 40 and to the various fluid valves during the expression of gas 12 from the insulating space 14. It is contemplated that the filter member 120 can be in the form of a planar screen 130 that extends across the filter recess 110 defined within the trim breaker 26, or defined within the inner liner 24 and/or outer wrapper 22. It is further contemplated that the filter member 120 can be in the form of a filter tube 132 that is disposed within the filter recess 110 of the trim breaker 26, or other component of the structural cabinet 16. In such an embodiment, the filter tube 132 and the filter recess 110 cooperate to define the gas conduit 40.

It is contemplated that the filter member 120, whether a planar screen 130, such as a mesh barrier, or filter tube 132, can include a plurality of filter apertures that are sized to be generally smaller than the particle size of the insulating material 44. Accordingly, the filter member 120 can serve to contain the insulating material 44 within the insulating space 14 and prevent or substantially prevent the infiltration of the insulating material 44 within the gas conduit 40. It is also contemplated that the mesh size of the filter member 120 can be adapted to be smaller than the vent apertures defined within the exterior surface of the structural cabinet 16 proximate each of the valves. Accordingly, where insulating material 44 does infiltrate the gas conduit 40, such particles of insulating material 44 may be small enough to pass through the vent apertures and out from the gas conduit 40, such that the free or substantially free movement of gas 12 through the gas conduit 40 can be maintained during formation of the vacuum insulated structure by the vacuum generating system 10.

Referring again to FIGS. 1-11, it is contemplated that the first and second gas pressures 60, 62 that serve to operate the various gas valves 50 between the open and closed positions 52, 54 can be generated by a vacuum pump 66 that is placed in communication with the at least one gas valve 50. Accordingly, the vacuum pump 66 is adapted to selectively generate and dissipate an at least partial vacuum 20 within the vacuum chamber 64 that is selectively positioned at least proximate the front face 28 of the structural cabinet 16 and potentially around the entire structural cabinet 16. Accordingly, as discussed above, the expression of air from the structural cabinet 16 places the various gas valves 50 in the open position 52. Once the first and second gas pressures 60, 62 within the vacuum chamber 64 and inside the insulating space 14, respectively, are equalized, the gas valves 50 are moved to the closed position 54. As discussed above, once air is reintroduced into the vacuum chamber 64, the gas valves 50 are maintained in the closed position 54 such that the at least partial vacuum 20 within the insulating space 14 can be maintained when air is returned to the vacuum chamber 64.

Referring now to FIGS. 1-14, it is contemplated that the appliance 18 can include the structural cabinet 16 that has the interior cavity 100 defined by the inner liner 24, the outer wrapper 22 and the trim breaker 26 that extends between the inner liner 24 and outer wrapper 22. As discussed above, the gas conduit 40 is defined within the interior cavity 100 of the structural cabinet 16. The interior cavity 100 also includes an insulating space 14 that is partially separated from the gas conduit 40 by the filter member 120. The plurality of gas valves 50 are selectively operable between open and closed positions 52, 54. As discussed above, the open position 52 is defined between fluid communication between the exterior 42 of the structural cabinet 16 and the insulating space 14 via the gas conduit 40. The closed position 54 of the gas valves 50 is defined by the interior cavity 100 being hermetically sealed from the exterior 42 of the structural cabinet 16 at the plurality of gas valves 50. As discussed above, the gas conduit 40 can be defined within a portion of the trim breaker 26. It is also contemplated, in various embodiments, that the various conduits can be defined within portions of the inner liner 24 and outer wrapper 22. In each of these embodiments, it is contemplated that the gas conduit 40 includes the filter member 120 that serves to contain the insulating material 44 within the insulating space 14 and substantially prevents the infiltration of the insulating material 44 into the gas conduit 40.

Referring again to FIGS. 6-8 and 12-14, it is contemplated that the vacuum chamber 64 can be in the form of a vacuum frame 140 that engages the structural cabinet 16 proximate the front face 28 of the structural cabinet 16. In such an embodiment, the vacuum frame 140 can attach to the front face 28, and may at least partially extend around portions of the front face 28 to securely engage the structural cabinet 16. Where the vacuum frame 140 is utilized, the vacuum frame 140 expresses gas 12 from an area proximate the front face 28 of the structural cabinet 16 to define the first air pressure at the exterior 42 of the structural cabinet 16 to be less than the second air pressure, thereby moving the various gas valves 50 to the open position 52. While the gas valves 50 are in the open position 52, gas 12 is expressed from the insulating space 14 and through the gas valves 50 in the open position 52 via the gas conduit 40. As discussed above, once the first and second gas pressures 60, 62 define an equalized pressure 70 through the expression of gas 12 from the vacuum chamber 64 and the insulating space 14, the various gas valves 50 move to the closed position 54. Once in the closed position 54, the vacuum frame 140 allows air to return to the vacuum chamber 64 and around the exterior surface of the structural cabinet 16 proximate the front face 28. Because the first air pressure is greater now than the second air pressure, the pressure differential between the exterior 42 of the structural cabinet 16 and the insulating space 14 pushes the operable flap 92 against the exterior 42 of the structural cabinet 16 and maintains the hermetic seal at the various gas valves 50 to prevent infiltration of gas 12 into the insulating cavity via the gas conduit 40. Once air is returned to the vacuum chamber 64 within the vacuum frame 140, the vacuum frame 140 can be removed and the gas valves 50 continue to be maintained in the closed position 54 to maintain the at least partial vacuum 20 within the insulating space 14.

According to the various embodiments, the use of the vacuum frame 140 versus the fully enclosing vacuum chamber 64 as part of the vacuum generating system 10 can depend upon various factors that can include, but are not limited to, the placement of the various gas valves 50 and the path of the gas conduit 40, the size of the structural cabinet 16, the configuration of the various walls of the structural cabinet 16, the thickness of the walls of the structural cabinet 16, the composition of the insulating material 44 within the structural cabinet 16, combinations thereof, and other similar factors. Typically, where all of the gas valves 50 are disposed in the front face 28 of the structural cabinet 16, the use of the vacuum frame 140 can be advantageous since all of the gas valves 50 are substantially within the same vertical plane along the front face 28 of the structural cabinet 16. Alternatively, where the various gas valves 50 are disposed within the trim breaker 26, the inner liner 24 and outer wrapper 22, the use of the fully enclosing vacuum chamber 64 may be more advantageous due to the more complex placement of the various gas valves 50.

It is also contemplated that various sections of the filter member 120 may be extended into interior portions of the insulating space 14. In this manner, portions of the gas conduit 40 may extend distal from the various gas valves 50 and may be run into more remote sections of the insulating space 14 to allow for the more efficient movement of the gas 12 from the insulating space 14, through the gas conduit 40, and to the various gas valves 50 of the vacuum generating system 10. These branch sections 150 (shown in FIG. 2) of the filter member 120 can be run through interior portions of each of the walls of the structural cabinet 16, along corners of the structural cabinet 16, along inward surfaces of the inner liner 24 and/or outer wrapper 22 and other locations to allow for the more efficient flow of gas 12 from the insulating space 14 to the gas conduit 40. It is contemplated that the use of these branch sections 150 of the gas conduit 40 may need to be limited in order to prevent the placement of the branch sections 150 from detracting from the insulating functions of the structural cabinet 16. To prevent such a condition, the branch sections 150 of the gas conduit 40 may be of a finer diameter filter tube 132 such that the various branch sections 150 occupy only a very minimal space within the various sections of the insulating space 14 of the structural cabinet 16, while also allowing for the efficient movement of gas 12 through the insulating space 14.

Referring now to FIGS. 1-15, having described the various embodiments of the vacuum generating system 10, a method 400 is disclosed for forming a vacuum insulated structure within a structural cabinet 16. According to the method 400, a trim breaker 26 is coupled to an inner liner 24 and an outer wrapper 22 to define a structural cabinet 16 and an insulating space 14 disposed therein (step 402). It is contemplated that the trim breaker 26 can define the interior gas conduit 40 that is at least partially separated from the insulating space 14. During the formation of the structural cabinet 16, an insulating material 44 can be disposed within the insulating space 14 (step 404). Various insulating materials 44 can include, but are not limited to, vacuum insulated panels, microspheres, nanospheres, fibrous insulating material, various silica-based materials, combinations thereof and other similar insulating materials. The plurality of gas valves 50 are attached to the structural cabinet 16, where each of the gas valves 50 is adapted to be in selective communication with the insulating space 14 via the interior gas conduit 40 (step 406). It is contemplated that the plurality of gas valves 50 can be set within a portion of the trim breaker 26 and at least partially extend into the gas conduit 40 defined within the trim breaker 26. In such an embodiment, it is contemplated that the trim breaker 26 may be an injection molded member that is injection molded around the various gas valves 50. It is also contemplated that the various gas valves 50 can be separately inserted into various portions of the trim breaker 26 after formation of the trim breaker 26. As discussed above, the various gas valves 50 can also be disposed within portions of the inner liner 24/or the outer wrapper 22 where the gas conduit 40 extends through portions of the inner liner 24 and outer wrapper 22 of the structural cabinet 16. After the structural cabinet 16 is formed, a vacuum chamber 64 is placed around at least a portion of the structural cabinet 16, such that the plurality of gas valves 50 are disposed within the vacuum chamber 64 (step 408). As discussed above, where the various gas valves 50 are disposed only along the front face 28 of the structural cabinet 16, the vacuum chamber 64 may be in the form of a vacuum frame 140 that attaches to the front face 28 of the structural cabinet 16.

Alternatively, where the various gas valves 50 are disposed around portions of the structural cabinet 16, such as in the trim breaker 26, in the inner liner 24 and/or in the outer wrapper 22, the entire structural cabinet 16 may be enclosed within a surrounding vacuum chamber 64. Once the vacuum chamber 64 is properly positioned with respect to the various gas valves 50, gas 12 can be expressed from the vacuum chamber 64 to define the first gas pressure 60 proximate the exterior 42 of the structural cabinet 16 and around the plurality of gas valves 50 (step 410).

As discussed above, where this first gas pressure 60 is less than a second gas pressure 62 defined within the insulating space 14 and a gas conduit 40, the various gas valves 50 are operated to define an open position 52 of the gas valves 50. As gas 12 is expressed from the vacuum chamber 64 to place the various valves in the open position 52, gas 12 is also expressed from the insulating space 14 through the plurality of gas valves 50 in the open position 52 via the gas conduit 40 and into the vacuum chamber 64 (step 412). In this manner, the expressed gas 12 from the insulating space 14 is further expressed from the vacuum chamber 64.

According to the various embodiments, as gas 12 is expressed through the gas conduit 40, the filter member 120 serves to maintain the insulating material 44 within the insulating space 14 and substantially prevent infiltration of the insulating material 44 into the gas conduit 40. After sufficient gas 12 is expressed from the vacuum chamber 64 and the insulating space 14, the plurality of gas valves 50 are placed in the closed position 54 that is defined by a substantially equalized pressure 70 within the vacuum chamber 64 outside the structural cabinet 16 and the insulating space 14 (step 414). Accordingly, the first gas pressure 60 is approximately equal to the second gas pressure 62 to define the substantially equalized gas pressure that allows the gas valves 50 to move to the closed position 54. After the gas valves 50 are moved to the closed position 54 and the insulating space 14 and gas conduit 40 are hermetically sealed from the exterior 42 of the structural cabinet 16 by the gas valves 50 in the closed position 54, gas 12 is returned to the vacuum chamber 64 (step 416). When gas 12 is returned to the vacuum chamber 64, the first gas pressure 60 now becomes greater than the second gas pressure 62 and the plurality of gas valves 50 are maintained in the closed position 54 by the lower second gas pressure 62 within the insulating cavity of the gas conduits 40. The lower second gas pressure 62 within the interior cavity 100 of the structural cabinet 16 draws the operable flap 92 inward and toward the exterior 42 of the structural cabinet 16 to maintain a hermetic seal at each of the gas valves 50.

According to the various embodiments, the use of the vacuum generating system 10 can assist in the distribution of the insulating material 44 throughout the insulating space 14. It is contemplated that the gas conduit 40 can be used during the process of disposing the insulating material 44 within the insulating space 14. As the insulating material 44 is blown, poured or otherwise deposited within the insulating space 14, gas 12 can simultaneously be drawn from the insulating space 14 and into the gas conduit 40. This movement of gas 12 from the insulating space 14 and through the gas conduit 40 acts as a vacuum to draw fine particulate insulating material 44 throughout the insulating space 14. Because the gas conduit 40 is spaced throughout portions of the interior cavity 100, the fine particulate insulating material 44 can be drawn in a plurality of directions to fill or substantially fill spaces that may exist between larger sized particles of insulating material 44. Accordingly, by using the gas conduit 40, a flow of powder insulating material 44 having a fine particle size can be drawn to fill substantially all areas of the insulating space 14. The use of the gas conduit 40 to draw the powder insulating material 44 throughout the insulating space 14 also serves to provide a more densely packed insulating material 44. This is especially true after the gas conduit 40 is implemented to generate the at least partial vacuum 20 within the interior cavity 100.

After the vacuum chamber 64 defines a first gas pressure 60 that is substantially equal to the surrounding atmosphere, the vacuum chamber 64 is separated from the structural cabinet 16 (step 418). The atmospheric pressure around the structural chamber is greater than the second gas pressure 62 within the interior cavity 100 of the structural cabinet 16, such that the gas valves 50 are maintained in the closed position 54. Accordingly, the at least partial vacuum 20 within the insulating space 14 with the gas conduit 40 is maintained after the vacuum chamber 64 is separated from the structural cabinet 16.

According to the various embodiments, the vacuum generating system 10 described herein can be used for generating the vacuum insulated structure within the various appliances 18. These appliances 18 can include, but are not limited to, refrigerators, freezers, ovens, various other appliances, vacuum insulated structures, vacuum insulated panels, and other similar vacuum-based insulation systems. It is also contemplated that the materials of the structural cabinet 16 can vary, where such materials can include, but are not limited to, metals, plastics, various polymers, combinations thereof and other similar materials. Typically, the trim breaker 26 for the structural cabinet 16 will be made of plastic that is either attached to the inner liner 24 and outer wrapper 22 or is injection molded around portions of the inner liner 24 and outer wrapper 22. The inner liner 24 and outer wrapper 22 may be made of various rigid materials that can include, but are not limited to, metals, plastics, combinations thereof, and other similar rigid-type materials.

It is further contemplated that the placement of the gas conduit 40, within portions of the trim breaker 26, can vary. As exemplified in FIGS. 4 and 5, the gas conduit 40 may be disposed proximate an attachment point for either one of the inner liner 24 and outer wrapper 22. It is also contemplated that the gas conduit 40 may be centrally disposed within the trim breaker 26. The exact placement of the gas conduit 40 and the gas valves 50 can vary depending upon the design of the appliance 18, as dictated by the various factors discussed herein.

According to the various embodiments, the use of the vacuum generating system 10 allows for providing a well packed insulating material 44 within the insulating space 14, particularly around the trim breaker 26 where the gas conduit 40 is typically located. The well packed insulating material 44 provides for lower thermal conductivity through the structural cabinet 16 and at the trim breaker 26. Maintaining a lower thermal conductivity within and around the trim breaker 26 is useful to prevent external condensation on the refrigerator walls and near the interface between the structural cabinet and the doors and other operable panels of the appliance 18.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only.

Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A trim breaker assembly for an insulating structure, the trim breaker assembly comprising:

a trim breaker configured to extend between opposing metallic panels to define a cavity having an insulating space therein;

a filter recess defined by a surface of the trim breaker;

a gas conduit disposed within the cavity and partially defined by the filter recess and adapted to define selective communication between the insulating space adjacent the filter recess and an exterior area proximate an exterior surface of the trim breaker; and a filter member entirely positioned within the cavity and coupled with the trim breaker proximate the filter recess, wherein the filter member separates the insulating space from the gas conduit, and wherein the filter member is in a form of at least a mesh barrier that is configured to permit gas to flow between the insulating space and the filter recess.

2. The trim breaker assembly of claim 1, further comprising:

at least one gas valve disposed within a portion of the trim breaker and configured to define selective communication between the filter recess and the exterior area.

3. The trim breaker assembly of claim 2, wherein the at least one gas valve is operable between open and closed positions, the open position defining a fluid communication between the filter recess and the exterior area via the gas conduit, the closed position defined by the gas conduit and the filter recess being sealed relative to the exterior area.

4. The trim breaker assembly of claim 3, wherein the open position is further defined by a first gas pressure present proximate the exterior area and a second gas pressure present proximate the filter recess, wherein the second gas pressure is less than the first gas pressure.

5. The trim breaker assembly of claim 4, wherein the closed position is further defined by the second gas pressure being equal to or less than the first gas pressure.

6. The trim breaker assembly of claim 3, wherein the at least one gas valve is an umbrella valve extending through the portion of the trim breaker.

7. The trim breaker assembly of claim 6, wherein the at least one gas valve includes an operable flap that is operable to define the open and closed positions.

8. The trim breaker assembly of claim 7, wherein the operable flap engages the exterior surface of the trim breaker in the closed position, the operable flap being deflected away from the trim breaker in the open position.

9. The trim breaker assembly of claim 1, wherein the mesh barrier includes a plurality of apertures and that is disposed within the filter recess of the trim breaker to cooperatively define the gas conduit.

10. A trim breaker assembly comprising:

a trim breaker configured to extend between opposing metallic panels to define an interior cavity;

a gas conduit that is at least partially defined by a filter recess of the trim breaker, the filter recess defined by an interior surface of the trim breaker;

a plurality of gas valves that are attached to the trim breaker and are selectively operable between open and closed positions, the open position defined by a fluid communication between the gas conduit and an exterior area defined by an exterior surface of the trim breaker via the gas conduit, the closed position defined by the gas conduit being sealed at the plurality of gas valves; and a filter member attached to the trim breaker at the filter recess and configured to further define the gas conduit and separate the gas conduit from the interior cavity, the filter member configured to permit gas to flow between the interior cavity and the gas conduit, and wherein the filter member includes at least one of a mesh barrier and a filter tube.

11. The trim breaker assembly of claim 10, wherein the gas conduit is defined by the filter recess and the mesh barrier of the filter member.

12. The trim breaker assembly of claim 10, wherein the plurality of gas valves extend at least partially into the gas conduit.

13. The trim breaker assembly of claim 10, wherein at least a portion of the plurality of gas valves are umbrella valves, each umbrella valve including an operable flap that engages the exterior surface of the trim breaker in the closed position.

14. The trim breaker assembly of claim 10, wherein the filter member is the filter tube that is disposed within the filter recess of the trim breaker to define the gas conduit.

15. The trim breaker assembly of claim 14, wherein the filter tube and the trim breaker cooperate to define the gas conduit.

16. A trim breaker assembly for an insulated cabinet, the trim breaker assembly comprising:

a trim breaker extending between metallic panels to define an interior cavity, an exterior surface of the trim breaker defining a front face of the trim breaker, an interior surface of the trim breaker at least partially defining a gas conduit that is adapted to define selective communication between the interior cavity and an exterior area defined by the front face of the trim breaker;

a filter member that engages the interior surface of the trim breaker to at least partially define the gas conduit, wherein the filter member is configured to separate a filter recess of the trim breaker from an insulating space of the interior cavity; and at least one gas valve disposed within the filter recess, wherein the at least one gas valve is operable between open and closed positions, the open position defining a fluid communication between the filter recess and the exterior area via the gas conduit, the closed position defined by the gas conduit being sealed relative to the exterior area, wherein the filter member is a mesh barrier that includes a plurality of apertures and that is disposed within the filter recess of the trim breaker to cooperatively define the gas conduit.

17. The trim breaker assembly of claim 16, wherein the at least one gas valve is an umbrella valve extending through a portion of the trim breaker.

18. The trim breaker assembly of claim 16, wherein the at least one gas valve includes an operable flap that engages the exterior surface of the trim breaker in the closed position, the operable flap being deflected away from the trim breaker in the open position.

19. The trim breaker assembly of claim 16, wherein the filter member is a filter tube that is disposed within the filter recess of the trim breaker, wherein the filter tube and the filter recess cooperate to define the gas conduit.

* * * * *